(12) United States Patent
Johnson, Sr. et al.

(10) Patent No.: US 10,976,000 B2
(45) Date of Patent: Apr. 13, 2021

(54) QUICK DETACH CONNECTOR

(71) Applicant: Really Right Stuff, LLC, Lehi, UT (US)

(72) Inventors: Joseph M. Johnson, Sr., Lehi, UT (US); Verent Chan, Lehi, UT (US)

(73) Assignee: Really Right Stuff, LLC, Lehi, UT (US)

( * ) Notice: Subject to any disclaimer, the term of this patent is extended or adjusted under 35 U.S.C. 154(b) by 0 days.

(21) Appl. No.: 16/538,324

(22) Filed: Aug. 12, 2019

(65) Prior Publication Data

US 2019/0360632 A1 Nov. 28, 2019

Related U.S. Application Data

(63) Continuation of application No. 15/897,734, filed on Feb. 15, 2018, now Pat. No. 10,422,467, which is a continuation of application No. 15/582,640, filed on Apr. 29, 2017, now Pat. No. 10,274,125.

(60) Provisional application No. 62/330,006, filed on Apr. 29, 2016.

(51) Int. Cl.
*F16M 11/04* (2006.01)
*G03B 17/56* (2021.01)

(52) U.S. Cl.
CPC ......... *F16M 11/041* (2013.01); *G03B 17/561* (2013.01)

(58) Field of Classification Search
None
See application file for complete search history.

(56) References Cited

U.S. PATENT DOCUMENTS

| | | | |
|---|---|---|---|
| 5,429,332 A | 7/1995 | Ishikawa | |
| 6,196,504 B1 | 3/2001 | Lemke | |
| 6,447,404 B1 | 9/2002 | Wilbur | |
| 6,773,110 B1 | 8/2004 | Gale | |
| 6,773,172 B1 | 8/2004 | Johnson et al. | |
| 7,440,026 B2 * | 10/2008 | Sousa | G03B 29/00 348/375 |
| D623,860 S | 9/2010 | Kope et al. | |
| D623,861 S | 9/2010 | Kope et al. | |
| 7,866,899 B2 | 1/2011 | Kope et al. | |
| D638,695 S | 5/2011 | Woodrow et al. | |
| D649,018 S | 11/2011 | Kope | |
| 8,047,729 B2 | 11/2011 | Kope | |
| D662,399 S | 6/2012 | Kope | |
| D662,400 S | 6/2012 | Kope | |
| D705,523 S | 5/2014 | Henry et al. | |
| 8,876,070 B2 | 11/2014 | Liu | |
| 8,948,438 B2 | 2/2015 | Hatton | |
| 8,979,397 B2 | 3/2015 | Henry | |
| 9,081,256 B2 | 7/2015 | Dering | |
| 9,140,961 B2 | 9/2015 | Henry | |
| 9,164,362 B2 | 10/2015 | Henry et al. | |

(Continued)

OTHER PUBLICATIONS

Web page, peakdesign.com/standardplate, Peak Design, Standard Plate, 4 pgs., at least one year prior to priority date.

(Continued)

*Primary Examiner* — Clayton E. LaBalle
*Assistant Examiner* — Leon W Rhodes, Jr.
(74) *Attorney, Agent, or Firm* — Chernoff, Vilhauer, McClung & Stenzel, LLP (57) ABSTRACT

A quick detach connector for an imaging device.

35 Claims, 11 Drawing Sheets

(56) References Cited

U.S. PATENT DOCUMENTS

| | | |
|---|---|---|
| 9,206,941 B2 | 12/2015 | Smith |
| 9,247,787 B2 | 2/2016 | Dering et al. |
| D750,349 S | 3/2016 | Henry et al. |
| 9,360,744 B2 | 6/2016 | Dering et al. |
| D788,205 S | 5/2017 | Jankura et al. |
| D802,649 S | 11/2017 | Dering et al. |
| D808,157 S | 1/2018 | Viger et al. |
| D808,162 S | 1/2018 | Viger et al. |
| 10,274,125 B2 | 4/2019 | Johnson, Sr. |
| 10,422,467 B2 | 9/2019 | Johnson, Sr. |
| 2004/0211837 A1 | 10/2004 | Eisenberg et al. |
| 2004/0219079 A1 | 11/2004 | Hagen et al. |
| 2005/0056313 A1 | 3/2005 | Hagen et al. |
| 2006/0243085 A1 | 11/2006 | Hannaford et al. |
| 2009/0180939 A1 | 7/2009 | Hagen et al. |
| 2010/0284681 A1 | 11/2010 | Kope et al. |
| 2011/0081143 A1 | 4/2011 | Kope et al. |
| 2011/0280566 A1 | 11/2011 | Cherubin |
| 2012/0014686 A1 | 1/2012 | Kope et al. |
| 2012/0174382 A1 | 7/2012 | Dering |
| 2013/0118685 A1 | 5/2013 | Hara |
| 2014/0050468 A1 | 2/2014 | Henry et al. |
| 2014/0155910 A1 | 6/2014 | Hannaford et al. |
| 2014/0341557 A1 | 11/2014 | Henry |
| 2015/0107427 A1 | 4/2015 | Gass et al. |
| 2015/0316205 A1 | 11/2015 | Bennett |
| 2015/0346589 A1 | 12/2015 | Dering et al. |
| 2015/0378246 A1 | 12/2015 | Henry |
| 2016/0084601 A1 | 3/2016 | Alicea, Jr. |
| 2016/0266503 A1 | 9/2016 | Van Voorst et al. |
| 2017/0066120 A1 | 3/2017 | Chang |
| 2017/0245894 A1 | 8/2017 | Ramsay |

OTHER PUBLICATIONS

Web page, Kickstarter.com, Kickstarter, The Fusion Plate—A Camera Accessory, 11 pgs., at least one year prior to priority date.

\* cited by examiner

QUICK DETACH CONNECTOR

CROSS-REFERENCE TO RELATED APPLICATIONS

This application is a continuation of U.S. patent application Ser. No. 15/897,734, filed Feb. 15, 2018, which is a continuation of U.S. patent application Ser. No. 15/582,640, filed Apr. 29, 2017, now U.S. Pat. No. 10,274,125, issued Apr. 30, 2019, which application claims the benefit of U.S. Provisional App. No. 62/330,006, filed Apr. 29, 2016.

BACKGROUND OF THE INVENTION

The present invention generally relates to a quick detach connector.

A conventional camera carrying system, such as affixing a shoulder strap to opposing ends of the camera, can make it problematic to compactly store the camera in a case when not in use. Also, the shoulder strap tends to hang up on portions of a tripod when affixing the camera to a tripod. Further, the shoulder strap tends to inhibit the ability to quickly obtain images when there is limited time in which to obtain an image.

What is desired, therefore, is a simplified system for a panoramic device.

DETAILED DESCRIPTION OF PREFERRED EMBODIMENTS

Figure 1:
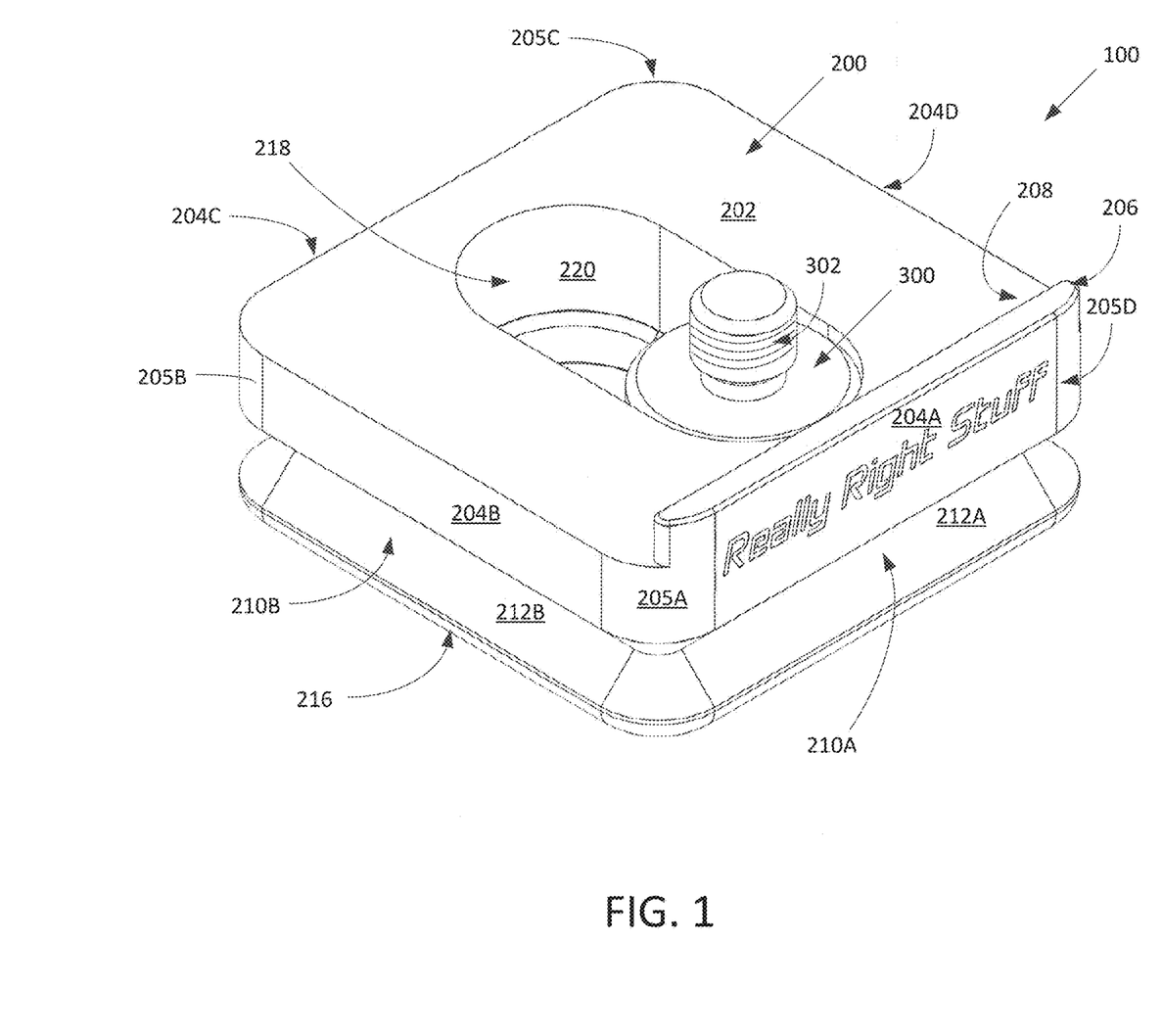
FIG. 1 illustrates an isometric view of a quick detach connector with a screw and mounting plate.
Figure 2:
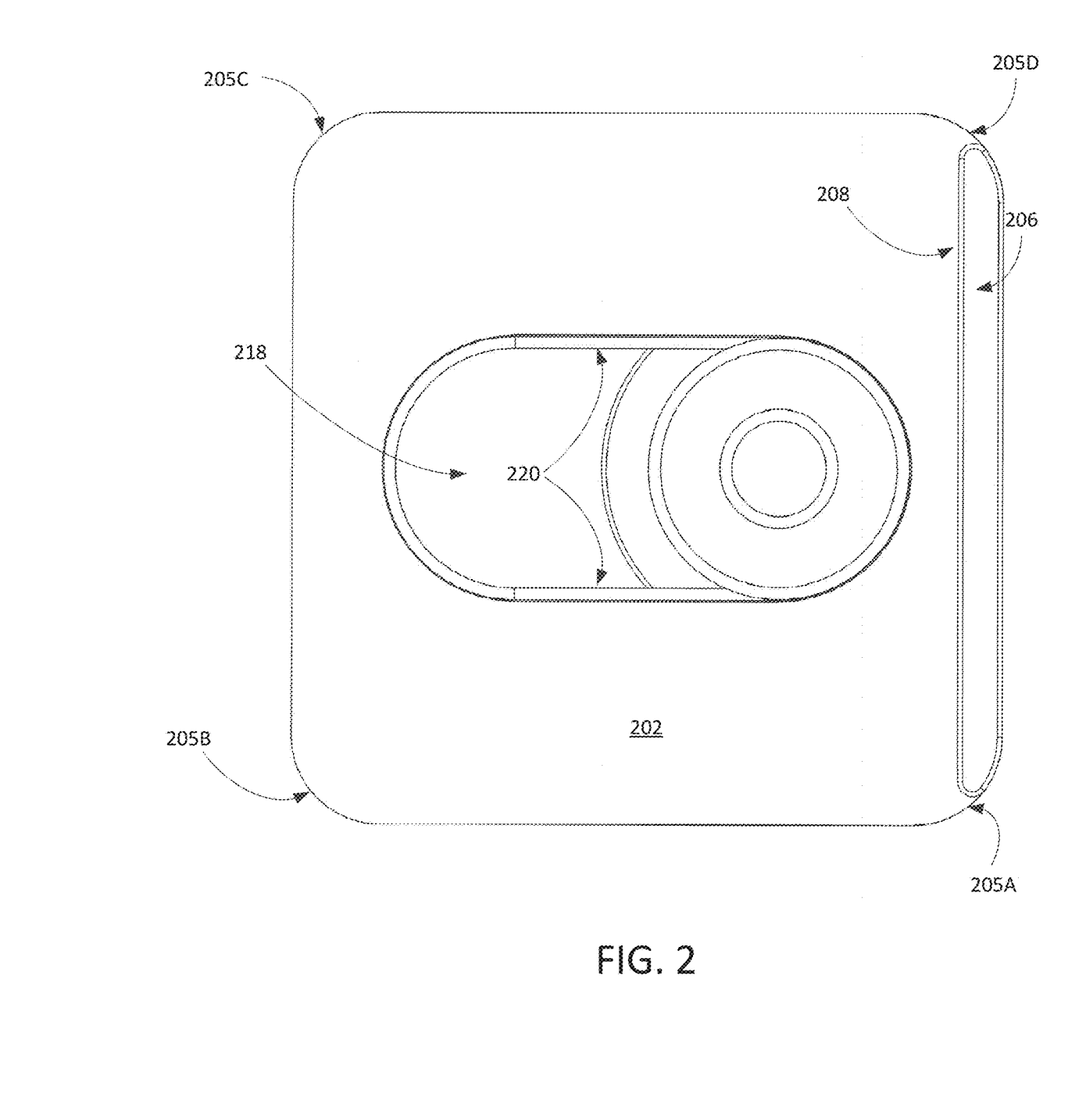
FIG. 2 illustrates a top view of the connector of FIG. 1.
Figure 3:
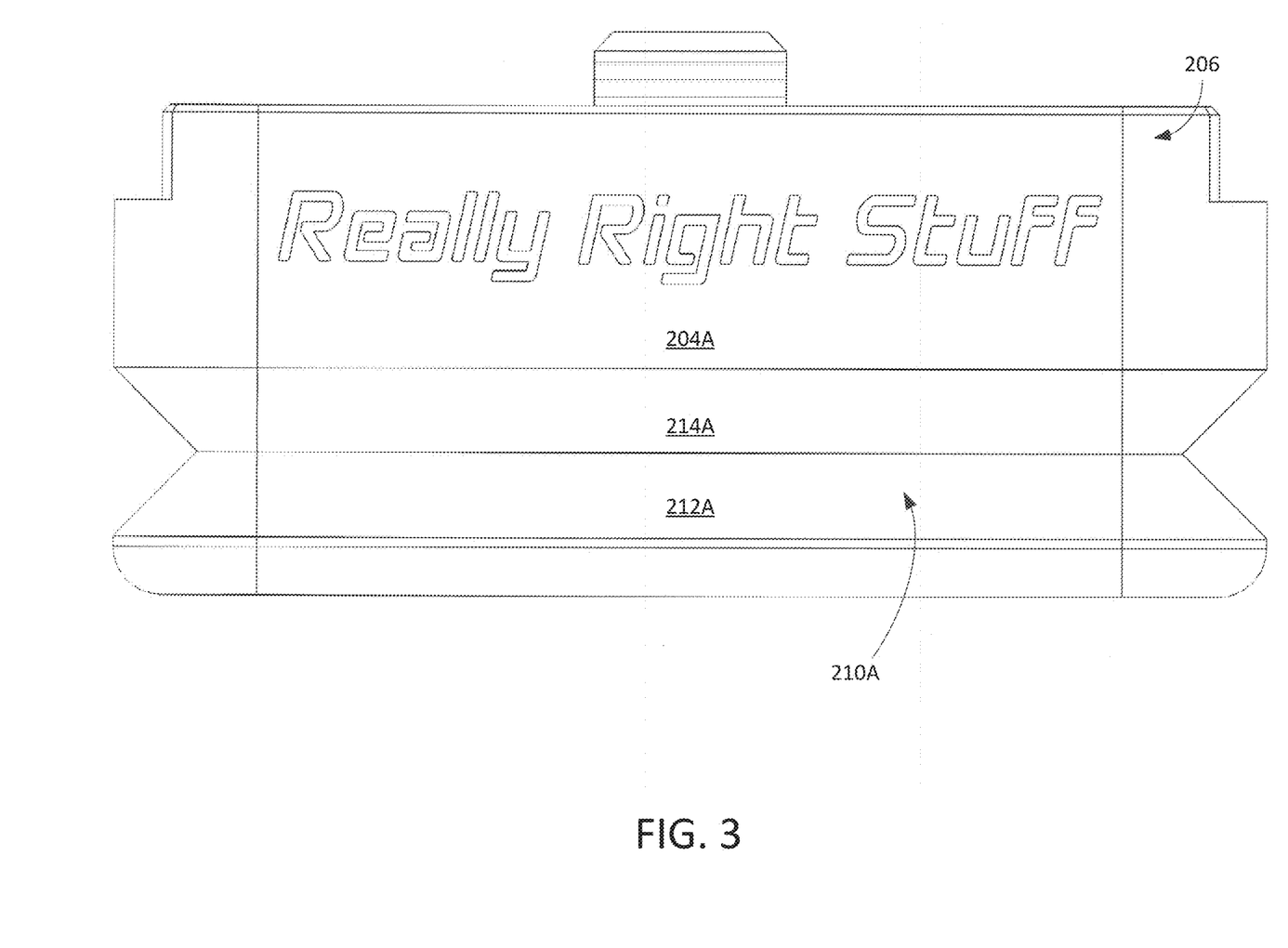
FIG. 3 illustrates a right side view of the connector of FIG. 1.
Figure 4:
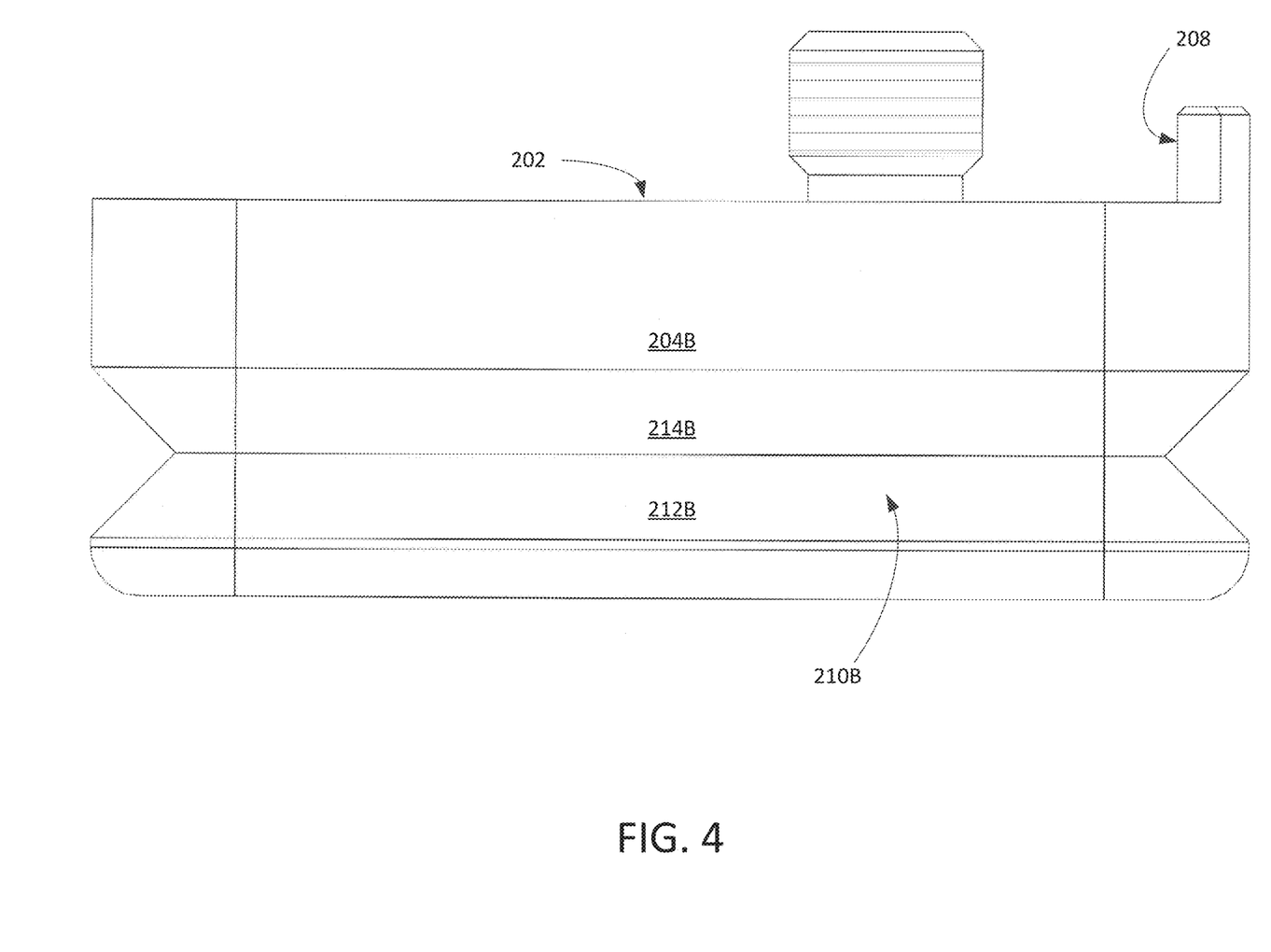
FIG. 4 illustrates a front side view of the connector of FIG. 1.
Figure 5:
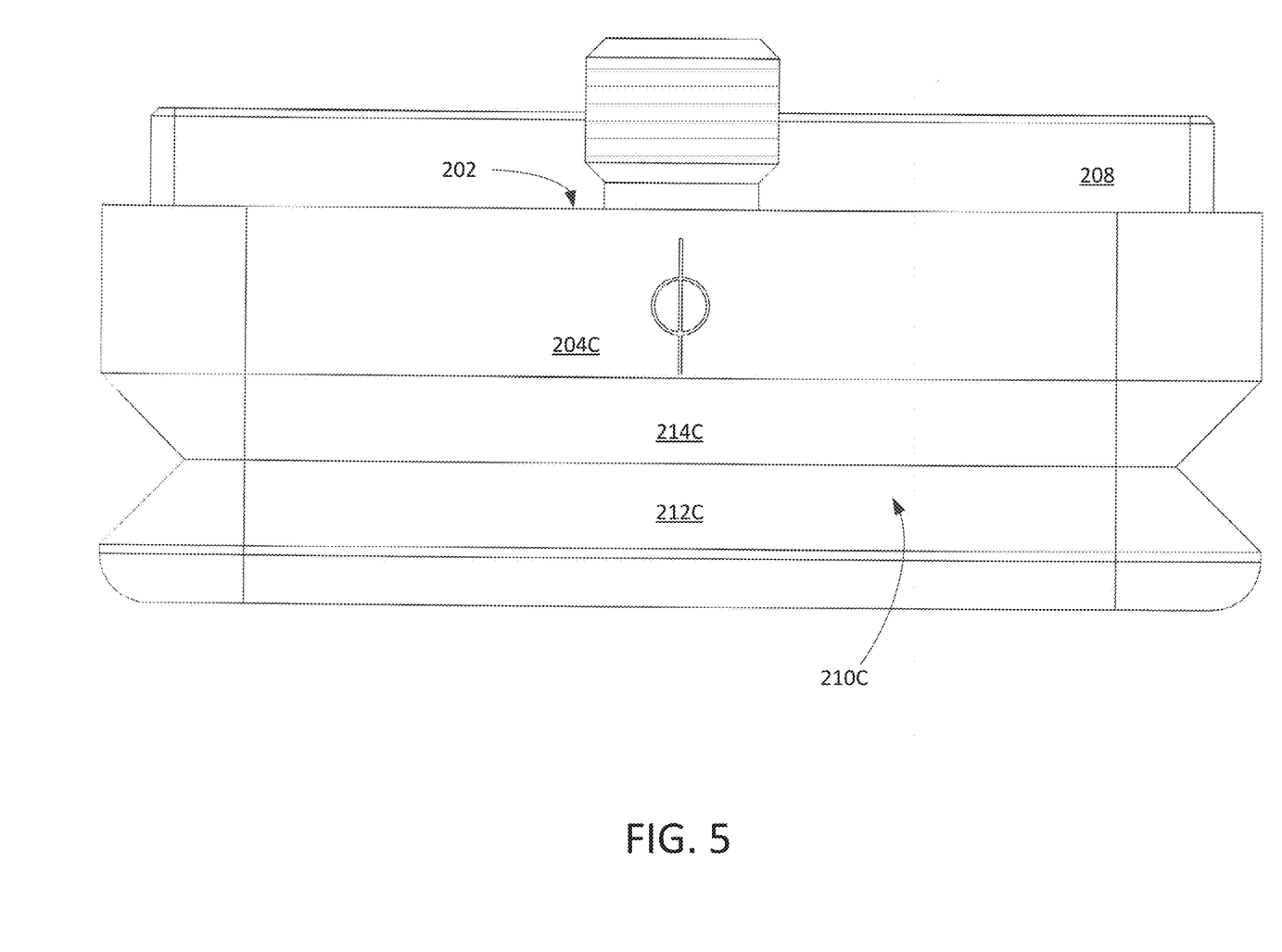
FIG. 5 illustrates a left side view of the connector of FIG. 1.
Figure 6:
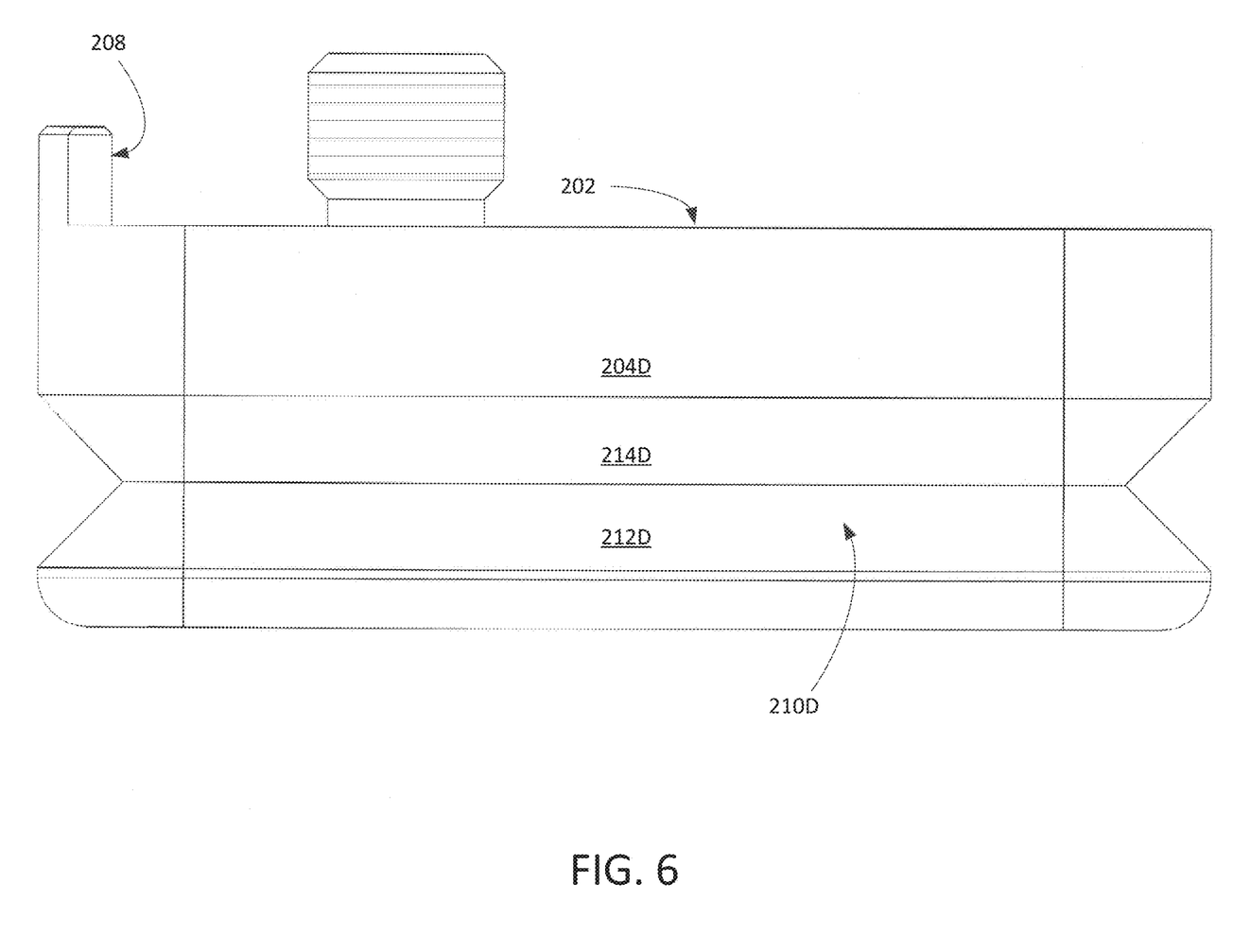
FIG. 6 illustrates a back side view of the connector of FIG. 1.
Figure 7:
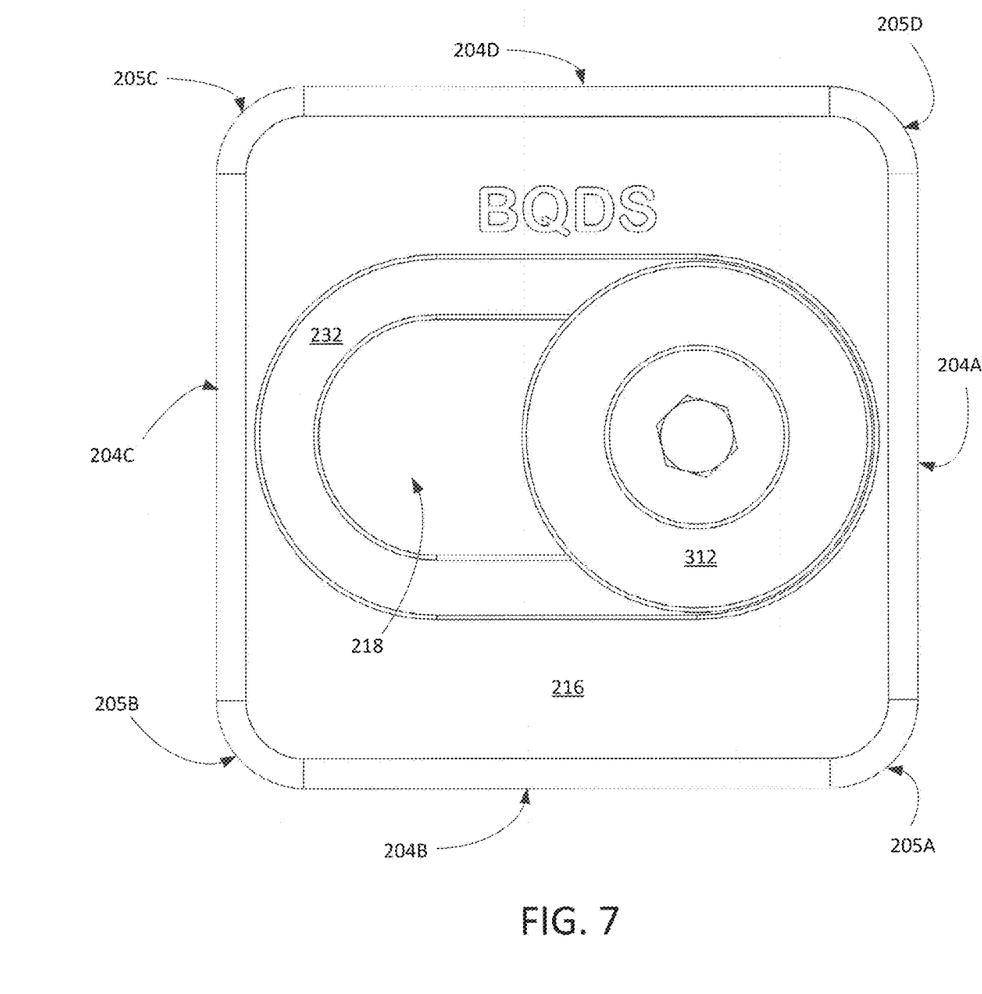
FIG. 7 illustrates a bottom view of the connector of FIG. 1.
Figure 11:
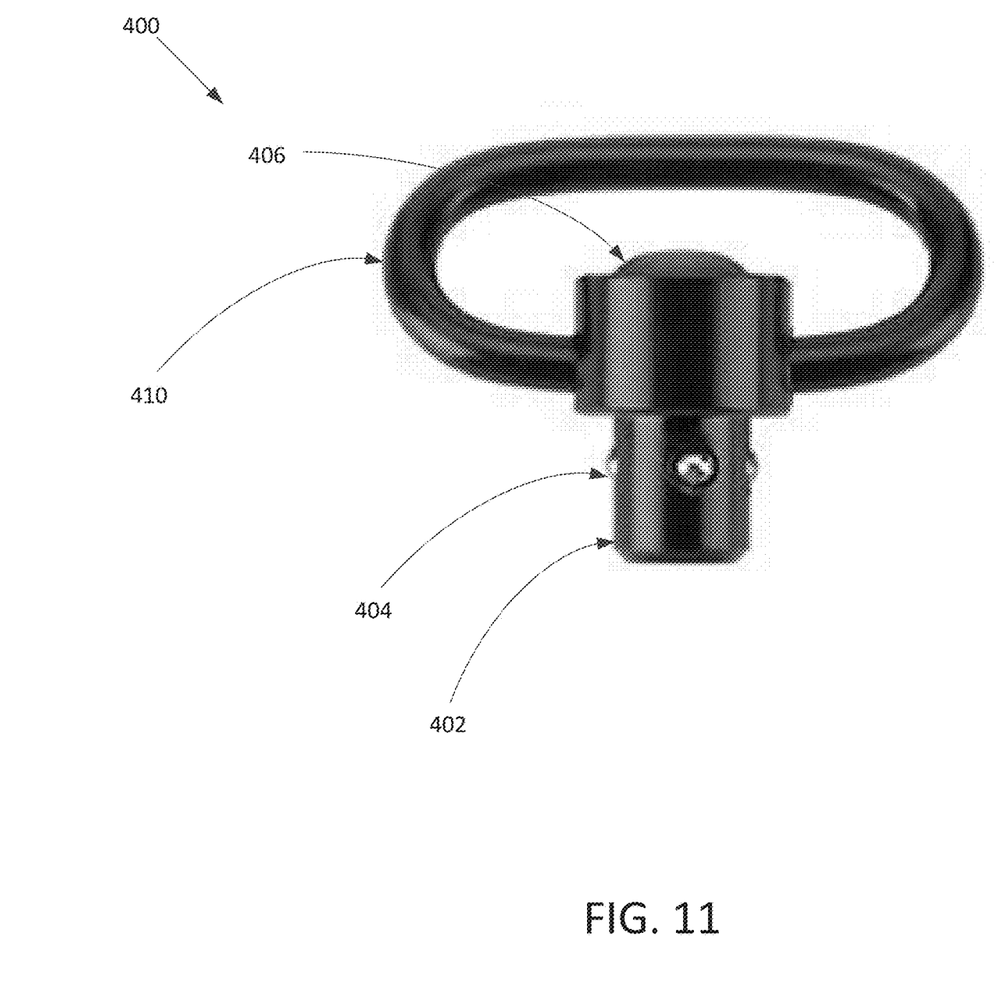
FIG. 11 illustrates an anchor suitable for engagement with the screw of FIG. 1.

Referring to FIG. 1, a quick detach connector 100 may include a mounting plate 200, a screw 300, and a strap anchor 400 (see FIG. 11). The mounting plate 200 may include a substantially planar upper surface 202 that may be positioned in a face-to-face abutment with the lower face of an imaging device, such as a camera. A top view of the quick detach connector 100 is illustrated in FIG. 2. With a face-to-face abutment, the imaging device may be supported by the mounting plate 200. The mounting plate 200 may be generally square or generally rectangular in shape with substantially planar side surfaces 204A, 204B, 204C, 204D. A right side view of the quick detach connector 100 is illustrated in FIG. 3. A front side view of the quick detach connector 100 is illustrated in FIG. 4. A left side view of the quick detach connector 100 is illustrated in FIG. 5. A back side view of the quick detach connector 100 is illustrated in FIG. 6. The mounting plate 200 preferably includes rounded corners 205A, 205B, 205C, 205D. A bottom view of the quick detach connector 100 is illustrated in FIG. 7. The mounting plate 200 may have any suitable peripheral shape and may have any suitable side surfaces.

The mounting plate 200 may include a raised flange 206 that extends above the upper surface 202. The raised flange 206 preferably includes a substantially planar interior surface 208. The raised flange 206 is preferably positioned so that it extends up the side of the imaging device with the interior surface 208 thereof in face-to-face abutment with the side surface of the imaging device. The interior surface 208 provides an anti-twist rotation structure for the mounting plate 200. Accordingly, in a preferred engagement, the upper surface 202 is in face-to-face engagement with the lower surface of the imaging device, while simultaneously, the interior surface 208 of the raised flange 206 is in face-to-face engagement with the side surface of the imaging device. Typically, the interior surface 208 is in abutment with the front surface of the imaging device (typically below the lens) or the rear surface of the imaging device (typically below a viewfinder). In some embodiments, the raised flange 206 may be omitted, in which preferably, the upper surface 202 includes a flexible pad supported thereon to inhibit rotation of the mounting plate 200. The mounting plate 200 may be detachably secured to the imaging device using a threaded portion 302 of the screw 300, described in more detail below.

The mounting plate 200 may define a set of dovetail grooves 210A, 210B, 210C, 210D each of which may include a lower inclined surface 212A, 212B, 212C, 212C, such as generally 45 degrees, and may include an upper inclined surface 214A, 214B, 214C, 214D, such as generally 45 degrees. With pairs of opposing dovetail grooves 210A, 210C and 210B, 210D the mounting plate 200 is suitable to be engaged with a Really Right Stuff or Arca Swiss compatible quick release system using either of the pairs of dovetail grooves 210A, 210C and 210B, 210D. One exemplary quick release system is illustrated in U.S. Pat. No. 6,773,172 which is incorporated by reference herein in its entirety.

Also referring to FIG. 7, the mounting plate 200 may include a substantially planar lower surface 216 that may be positioned in a face-to-face abutment with the upper face of a quick release device, such as a quick release clamp. With the face-to-face abutment, the imaging device may be supported by the mounting plate 200. The lower surface 216 may be non-planar, if desired.

Figure 8:
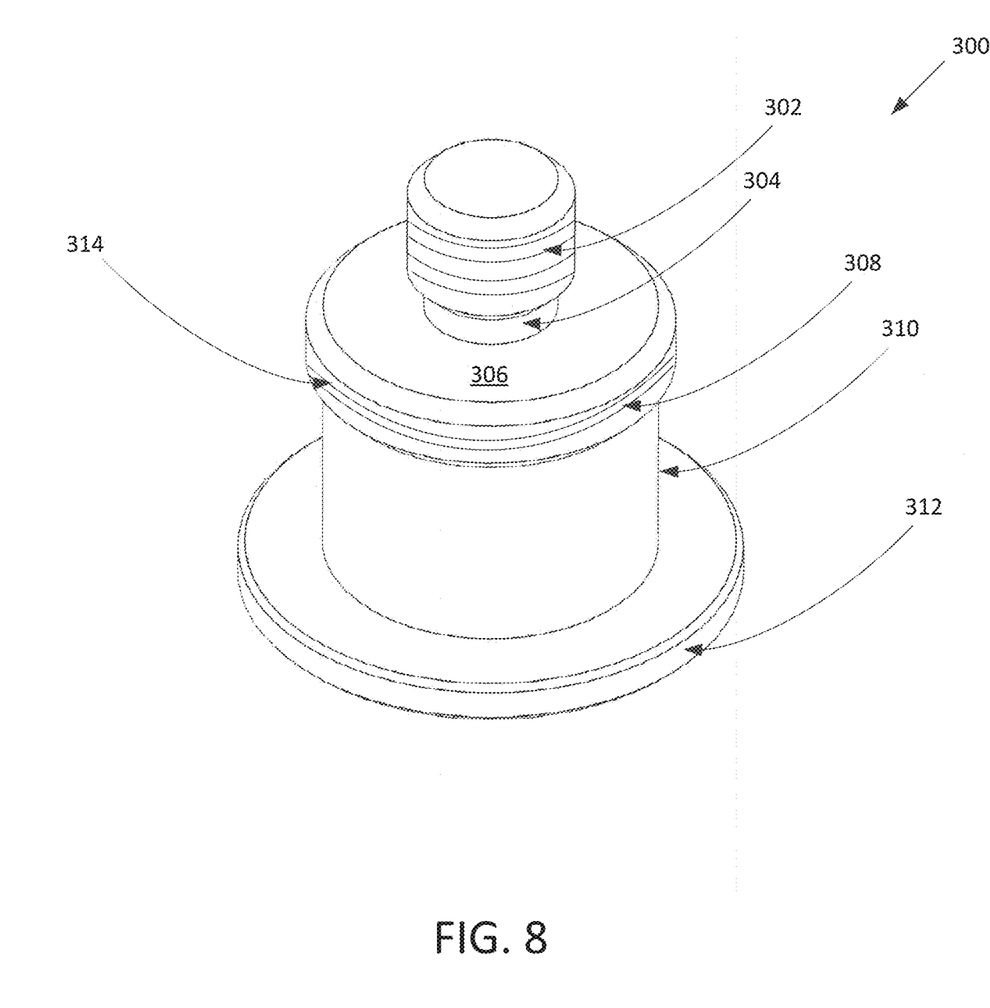
FIG. 8 illustrates an isometric view of the screw of FIG. 1.
Figure 9:
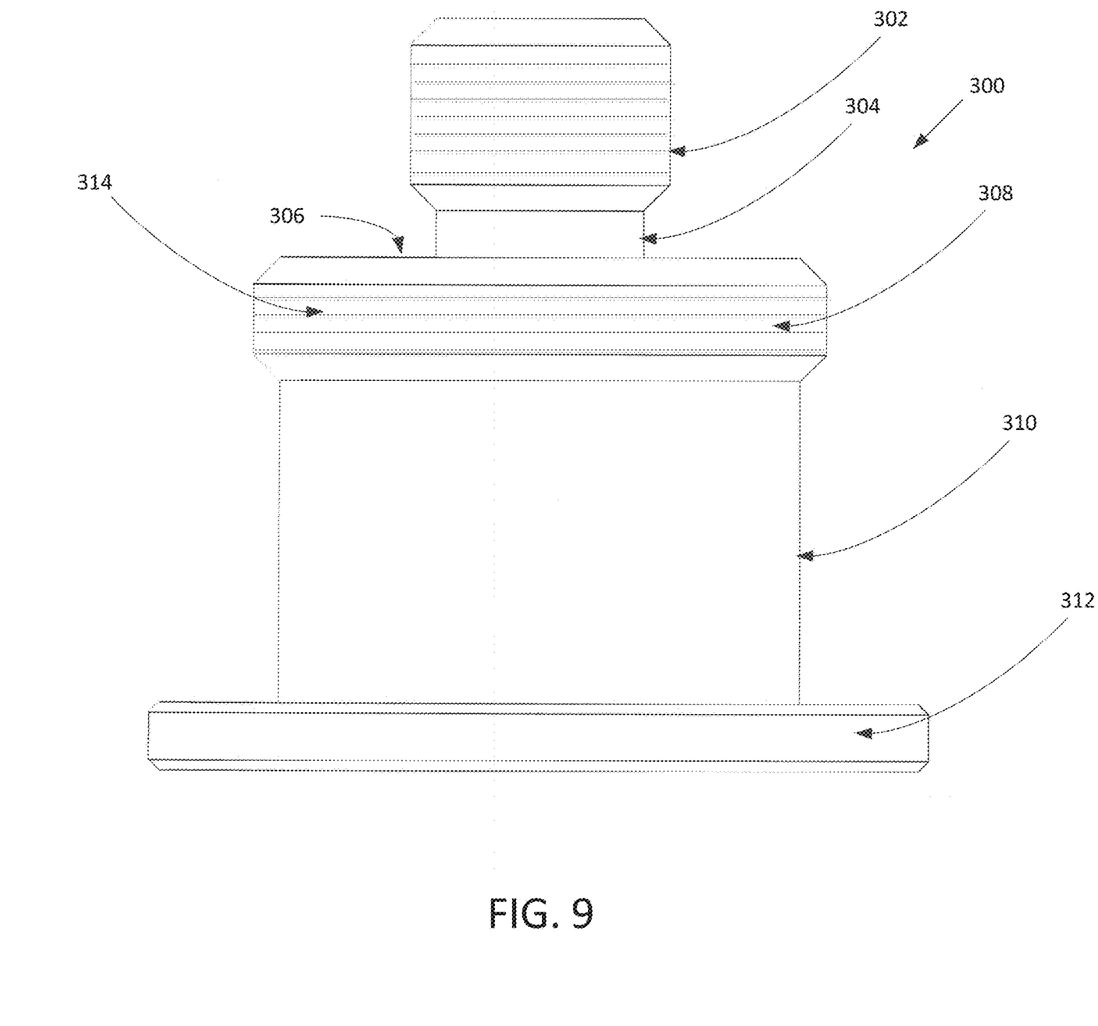
FIG. 9 illustrates a right side of the screw of FIG. 8.

The threaded portion 302 of the screw 300 may be engaged with a threaded opening defined by the imaging device to detachably engage the mounting plate 200 to the imaging device. Also, the threaded portion 302 of the screw may be engaged with another plate, that is in turn, attached to the imaging device. Referring also to FIG. 8 and FIG. 9, the screw 300 may include a recessed portion 304 and a substantially planar upper surface 306. The threaded portion 302 may be screwed into the threaded portion of the imaging device preferably until the upper surface 202 thereof comes into secure face-to-face engagement with the lower surface of the imaging device. The recessed portion 304 increases the likelihood that the screw 300 will be suitably engaged with the imaging device without becoming stuck thus making it difficult to remove the quick detach connector 100 from the imaging device. Preferably, the upper surface 306 of the screw 300 does not come into face-to-face engagement with the lower surface of the imaging device when the quick detach connector 100 is engaged therewith.

Figure 10:
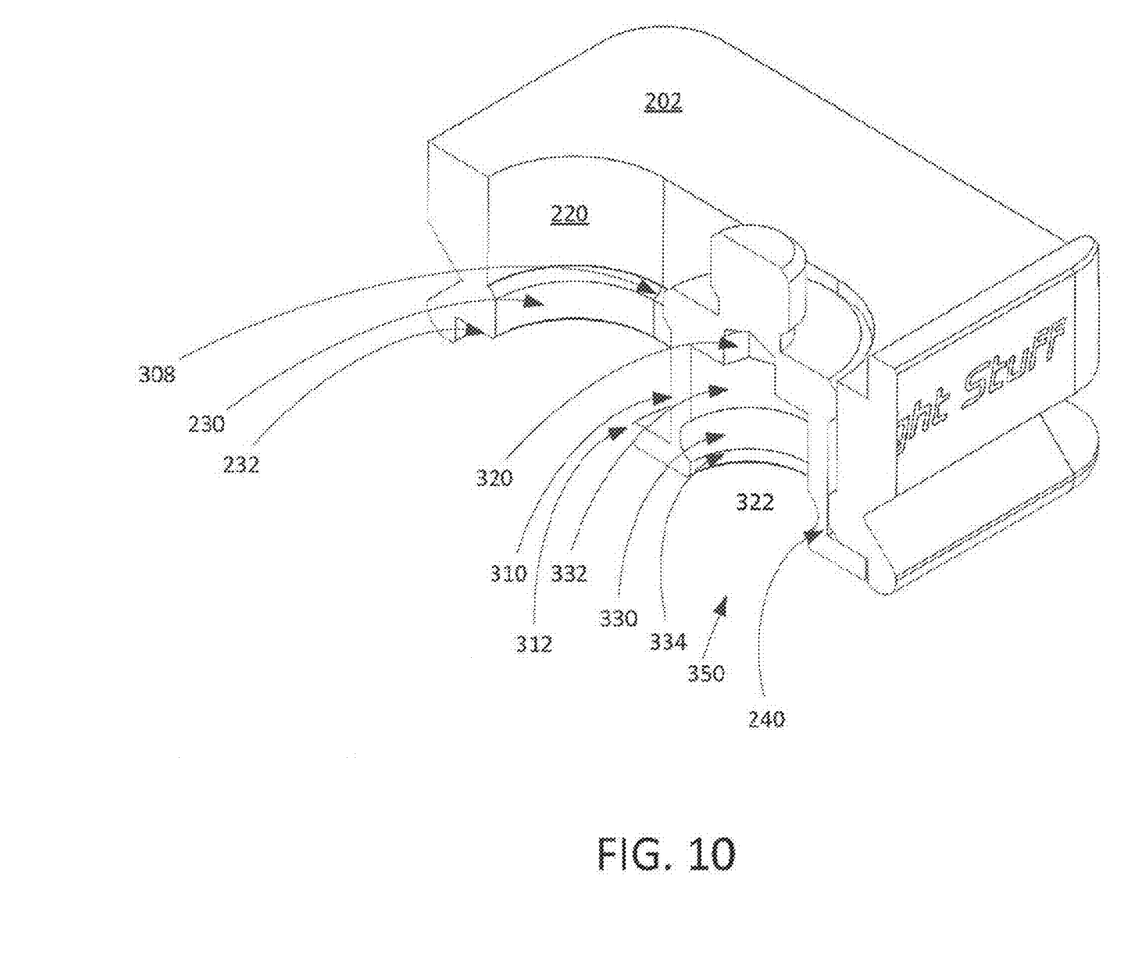
FIG. 10 illustrates a cut away view of the connector of FIG. 1.

Referring also to FIG. 10, the mounting plate 200 defines a slot 218 that is suitable to permit the screw 300 to slide in an axial direction within. The slot 218 may define a vertical wall 220 therein. The screw may include an upper flange portion 308 that is preferably sized to be approximately the same width as the slot 218 and preferably sized to have approximately the same curvature as the ends of the slot 218. In this manner, the screw 300 may slide back and forth relative to the slot 218 so that the mounting plate 200 may be positioned at a desired location on the lower surface of the imaging device. In addition, the screw 300 may slide back and forth relative to the slot 218 so that the mounting plate 200, an in particular the flange 308, may also be positioned at a desired location adjacent or in face-to-face abutment with the side surface of the imaging device. This also facilitates flexibility in the quick detach connector 100 being suitable for different imaging devices. Other configurations of providing at least partially retained movement of the screw relative to the mounting plate may be used, as desired.

The screw 300 may include another set of threads 314 on the upper flange 308. The interior of a portion of the slot 218, such as an end portion 240, may include a corresponding set of threads. The threads 314 of the screw are preferably sized to be rotatably engageable with the threads of the end portion 240, thereby permitting the screw 300 to rotatably pass through so that it is retained by the mounting plate 200. Also, the threads 314 of the screw permit the screw 300 to rotatably pass through so that it is selectably removable from the mounting plate 200. During normal operation of the quick detach connector 100, the screw 300 is effectively captured by the mounting plate 200. Also, the screw 300 may be retained by using other structures by the mounting plate 200.

The screw 300 may held captive under normal operating conditions by including the upper flange 308, a recessed portion 310 and a lower flange 312. The recessed portion 310 is maintained within the mounting plate 200 by a protruding interior flange 230. In this manner, the lower flange 312 prevents the screw 300 from being removed from the mounting plate 200 in an upwardly direction, and the upper flange 308 prevents the screw from being removed from the mounting plate 200 in a downwardly direction. Other structures may likewise be used, as desired, to maintain the screw from being readily disengaged from the mounting plate.

The screw 300 may define an internal hex structure 320 that may be accessed through a lower opening 322 of the screw 300. A hex wrench may be inserted through the lower opening 322 of the screw 300 and engaged with the internal hex structure 320. By rotating the hex wrench engaged with the internal hex structure 320, the screw 300 may be tightened and loosened from being engaged with the threaded opening of the imaging device. Other internal and/or external structures may be defined by the screw 300 to facilitate the engagement and disengagement of the screw, and the mounting plate, with the imaging device.

Referring also to FIG. 7, the mounting plate 200 may include a lower recess 232 that receives the lower flange 312. In this manner, the lower flange 312 may be inhibited in its movement by the lower recess 232. Also, the lower flange 312 may be inhibited in its movement by the combination of the upper flange 308 and the vertical wall 220. Also, preferably the thickness of the lower flange 312 is less than the depth of the recess 232 so that the lower flange 312 does not extend beyond the lower surface 216 and inhibit a suitable interconnection between the quick detach connector 100 and a quick release mechanism or another support. Further, depending on the structure of the screw 300 and the mounting plate 200, the lower flange 312 may limit the movement of the screw 300 relative to the mounting plate 200, when the screw 300 is engaged with an imaging device.

The screw 300 may define at a lower portion thereof an internal groove 330, that is preferably an arc. The internal groove 330 extends between a lower internal surface 334 and an upper internal surface 332. The upper internal surface 332 and the lower internal surface 334 preferably are both substantially tubular, both having the same diameter, and both being aligned with one another. The combination of the upper internal surface 332, the lower internal surface 334, and the internal groove 330 collectively form a receiver 350 that is preferably symmetrical about a central axis.

Referring to FIG. 11, an anchor 400 may include a tubular member 402 that includes a diameter and a length suitable to be received within the receiver 350. The anchor 400 may include one or more at least partial ball shaped members 404. The ball shaped members 404 protrude from the surface of the tubular member 402. The ball shaped members 404 are sized to be suitable to be received by the internal groove 330 when fully protruded from the surface of the tubular member 402. The position of the ball shaped members 404 protruding from the tubular member 402 are preferably located such that when the tubular member 402 is received within the receiver 350 the ball shaped members 404 extend into the internal groove 330. To engage the anchor 400 with the receiver 350, a button 406 may be depressed which permits the ball shaped members 404 to sufficiently recede within the tubular member 402 and upon releasing the button 406 when the anchor 400 is suitably inserted within the receiver, the ball shaped members 404 protrude to engage with the internal surface 322. With the anchor 400 engaged within the receiver 350, the anchor 400 does not readily become detached until the button 406 is depressed. The anchor 400 is also rotatably engaged with the screw 300 in such a manner that turning the anchor 400 does not substantially result in a similar turning of the screw 300, which would result in tightening or loosening of its engagement with the imaging device. The anchor 400 may include a pivotably engaged handle 410. In a similar manner, the handle 410 is also rotatably engaged and/or pivotably engaged with the screw 300 in such a manner that turning or pivoting the handle 410 does not substantially result in a similar turning of the screw 300, which would result in tightening or loosening of its engagement with the imaging device. The handle 410 may be engaged with a strap. In this manner, the imaging device, together with the quick detach connector 100 and the anchor 400, may be used as a shoulder strap or otherwise.

The detailed description, above, sets forth numerous specific details to provide a thorough understanding of the present invention. However, those skilled in the art will appreciate that the present invention may be practiced without these specific details. In other instances, well known methods, procedures, components, and circuitry have not been described in detail to avoid obscuring the present invention.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

We claim:

1. A connector for an imaging device comprising:
   (a) a mounting plate defining an upper surface and a lower surface;
   (b) a threaded member engaged with said mounting plate and a threaded portion at a terminal portion of said threaded member suitable for detachable engagement with said imaging device;
   (c) said mounting plate defining a pair of inclined edges suitable to be detachably engaged with a clamp;
   (d) said mounting plate defines an opening having a length suitable to permit the threaded member to shift in an axial direction within, said threaded member defining a first section with a diameter greater than a width of said opening, said threaded member defining a second section with a diameter less than said width of said opening, threaded member defining a third section with a diameter greater than said width of said opening, where said threaded member is engaged in a manner to said shift in said axial direction within said opening while being maintained within said opening by said first portion and said third portion being on opposing sides of said opening, wherein said length is greater than said width;
   (e) said opening defining a set of opening threads therein;
   (f) said connector defines a cavity therein that defines a hole, wherein said cavity defines a circular first portion defining a first diameter, wherein said cavity defines a circular second portion defining a second diameter where said second portion is further distant from said upper surface than said first portion and said second diameter is greater than said first diameter, wherein said cavity defines a circular third portion defining a third diameter where said third portion is further distant from said upper surface than said second portion and said second diameter is greater than said third diameter.

2. The connector of claim 1 wherein said mounting plate includes a substantially planar said upper surface that is suitable to be positioned in face-to-face abutment with a lower face of said imaging device.

3. The said connector of claim 1 wherein said second portion is circular and defines a smooth interior surface.

4. The connector of claim 3 wherein said first portion is circular and defines a smooth interior surface.

5. The connector of claim 4 wherein said third portion is circular and defines a smooth interior surface.

6. The connector of claim 1 further comprising a flange that extends above said upper surface.

7. The connector of claim 6 wherein said flange includes a substantially planar interior surface that extends at an incline suitable to be positioned so that said flange surface is in partial abutment with said side surface of said imaging device.

8. The connector of claim 1 wherein said mounting plate defines at least two dovetail grooves with said dovetail grooves on opposing sides of said mounting plate.

9. The connector of claim 1 wherein said lower surface is suitable to be placed in face-to-face abutment with a quick release device.

10. The connector of claim 1 wherein said threaded member defines a recessed portion adjacent to said threaded portion and an upper surface opposing said threaded portion.

11. The connector of claim 1 wherein said threaded member defines an upper flange portion size to be approximately the same diameter as said opening.

12. The connector of claim 11 wherein said upper flange portion defining a curvature that is substantially the same as a curvature of said opening.

13. The connector of claim 1 wherein movement of said threaded member within said opening of said mounting plate adjusts the relative location of a flange that extends above said upper surface when a threaded portion of said threaded member is engaged with said imaging device.

14. The connector of claim 1 wherein said threaded member defines an upper flange portion that defines a set of flange threads.

15. The connector of claim 14 wherein said flange threads are engageable within said opening.

16. The connector of claim 15 wherein engagement of said flange threads results in a recessed portion of said threaded member being retained from being freely removable from said opening.

17. The connector of claim 1 wherein said threaded member defines an internal hex structure.

18. The connector of claim 1 wherein said mounting plate defines a recessed portion therein proximate said opening.

19. The connector of claim 1 wherein said connector defines a receiver therein with a pair of opposed recesses suitable to receive a pair of ball shaped members.

20. A connector for an imaging device comprising:
   (a) a mounting plate defining an upper surface and a lower surface;
   (b) a threaded member engaged with said mounting plate and a threaded portion at a terminal portion of said threaded member suitable for detachable engagement with said imaging device;
   (c) said mounting plate defining a pair of inclined edges suitable to be detachably engaged with a clamp;
   (d) said mounting plate defines an opening permitting the threaded member to shift in an axial direction within, said threaded member defining a first section with a diameter greater than a length or width of said opening, said threaded member defining a second section with a diameter less than said length or width of said opening, threaded member defining a third section with a diameter greater than said length or width of said opening, where said threaded member is engaged in a manner to said shift in said axial direction within said opening while being maintained within said opening by said first portion and said third portion being on opposing sides of said opening, wherein said length is greater than said width;
   (e) a portion of said opening defining at least a set of opening threads therein;
   (f) said connector defines a cavity therein that defines a hole, wherein said cavity defines a circular first portion defining a first diameter, wherein said cavity defines a circular second portion defining a second diameter where said second portion is further distant from said upper surface than said first portion and said second diameter is greater than said first diameter, wherein said cavity defines a circular third portion defining a third diameter where said third portion is further distant from said upper surface than said second portion and said second diameter is greater than said third diameter.

21. The connector of claim 20 wherein said mounting plate includes a substantially planar said upper surface that is suitable to be positioned in face-to-face abutment with a lower face of said imaging device.

22. The said connector of claim 20 wherein said second portion is circular and defines a smooth interior surface.

23. The connector of claim 22 wherein said first portion is circular and defines a smooth interior surface.

24. The connector of claim 23 wherein said third portion is circular and defines a smooth interior surface.

25. The connector of claim 20 wherein said mounting plate defines at least two dovetail grooves with said dovetail grooves on opposing sides of said mounting plate.

26. The connector of claim 20 wherein said lower surface is suitable to be placed in face-to-face abutment with a quick release device.

27. The connector of claim 20 wherein said threaded member defines a recessed portion adjacent to said threaded portion and an upper surface opposing said threaded portion.

28. The connector of claim 20 wherein said threaded member defines an upper flange portion size to be approximately the same diameter or width as said opening.

29. The connector of claim 20 wherein movement of said threaded member within said opening of said mounting plate adjusts the relative location of a flange that extends above said upper surface when a threaded portion of said threaded member is engaged with said imaging device.

30. The connector of claim 20 wherein said threaded member defines an upper flange portion that defines a set of flange threads.

31. The connector of claim 30 wherein said flange threads are engageable within said opening.

32. The connector of claim 31 wherein engagement of said flange threads results in a recessed portion of said threaded member being retained from being freely removable from said opening.

33. The connector of claim 20 wherein said threaded member defines an internal hex structure.

34. The connector of claim 20 wherein said mounting plate defines a recessed portion therein proximate said opening.

35. The connector of claim 20 wherein said connector defines a receiver therein with a pair of opposed recesses suitable to receive a pair of ball shaped members.

\* \* \* \* \*

UNITED STATES PATENT AND TRADEMARK OFFICE
CERTIFICATE OF CORRECTION

PATENT NO. : 10,976,000 B2
APPLICATION NO. : 16/538324
DATED : April 13, 2021
INVENTOR(S) : Johnson, Sr. et al.

It is certified that error appears in the above-identified patent and that said Letters Patent is hereby corrected as shown below:

In the Specification

At Column 2, Line 33: Replace the second occurrence of "212C" with --212D--;

At Column 3, Line 15: Replace "an" with --and--; and

At Column 3, Line 37: After "may" insert --be--.

Signed and Sealed this
Thirty-first Day of May, 2022

Katherine Kelly Vidal
*Director of the United States Patent and Trademark Office*